United States Patent
Munuri et al.

(10) Patent No.: US 12,353,372 B2
(45) Date of Patent: Jul. 8, 2025

(54) METHODS AND SYSTEMS FOR DATA MANAGEMENT, INTEGRATION, AND INTEROPERABILITY

(71) Applicant: Trigyan Corporation Inc., Iselin, NJ (US)

(72) Inventors: Srinivas Munuri, Iselin, NJ (US); Rutherford Le Blang, Iselin, NJ (US); Girish J. Showkatramani, Iselin, NJ (US)

(73) Assignee: Trigyan Corporation Inc., Iselin, NJ (US)

( * ) Notice: Subject to any disclaimer, the term of this patent is extended or adjusted under 35 U.S.C. 154(b) by 118 days.

(21) Appl. No.: 18/140,327

(22) Filed: Apr. 27, 2023

(65) Prior Publication Data

US 2023/0350862 A1    Nov. 2, 2023

Related U.S. Application Data

(63) Continuation-in-part of application No. 17/503,605, filed on Oct. 18, 2021, now abandoned.

(51) Int. Cl.
| | |
|---|---|
| *G06F 16/215* | (2019.01) |
| *G06F 16/22* | (2019.01) |
| *G06F 16/23* | (2019.01) |
| *G06F 16/25* | (2019.01) |
| *G06F 16/28* | (2019.01) |

(52) U.S. Cl.
CPC ........ *G06F 16/215* (2019.01); *G06F 16/2228* (2019.01); *G06F 16/2365* (2019.01); *G06F 16/258* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2004/0034651 A1* | 2/2004 | Gupta | G06F 16/8358 707/999.102 |
| 2014/0280218 A1* | 9/2014 | Ryan | G06F 16/258 707/756 |
| 2016/0314183 A1* | 10/2016 | Bremer | G06F 16/22 |
| 2022/0374401 A1* | 11/2022 | Oberhofer | G06F 16/285 |

* cited by examiner

*Primary Examiner* — Richard L Bowen
(74) *Attorney, Agent, or Firm* — Rimon Law, P.C.

(57) ABSTRACT

Embodiments herein relate to data management and, more particularly, to collecting data from a plurality of sources, and linking the collected data to derive information and knowledge. The method includes defining at least one data model and asset by including data models, vocabulary, data quality rules, data mapping rules for at least one of, a particular data industry, a data domain, or a data subject area, importing data from a plurality of data sources, performing de-duplication of the imported data and data profiling of the imported data, and creating linked data either by semantic mapping, or by curating the data.

20 Claims, 19 Drawing Sheets

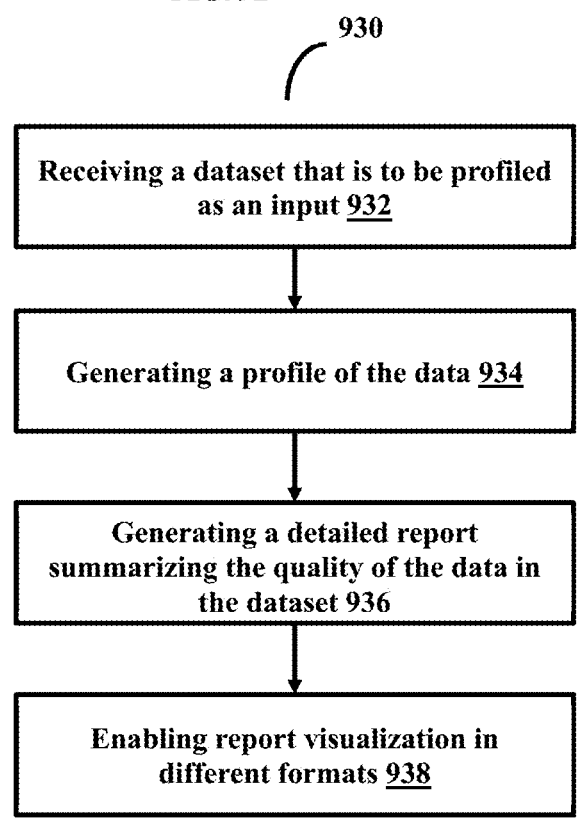

METHODS AND SYSTEMS FOR DATA MANAGEMENT, INTEGRATION, AND INTEROPERABILITY

CROSS REFERENCE TO RELATED APPLICATION

This application is based on and is a Continuation-in-Part (CIP) of U.S. application Ser. No. 17/503,605 filed Oct. 18, 2021, the contents of which are incorporated herein by reference.

TECHNICAL FIELD

The embodiments herein relate to data management and, more particularly, to collecting data from a plurality of sources, and linking the collected data to derive information and knowledge (i.e., providing a linked data intelligence via a knowledge graph) and providing a fully connected and interoperable data cloud available via open and community standards.

BACKGROUND

In general, organizations collect data of users/customers from various sources and perform a data management process on the collected data. The data management process includes validating, centralizing, standardizing, and organizing the collected data in order to produce high quality, and accurate insights that improve a decision making ability of the organizations and overall use of the collected data. The volume, velocity, and variety of the data collected by the organizations are growing faster than ever before. In conventional approaches, the organizations may utilize various Enterprise Data Management (EDM) tools to perform the data management process on the collected data. However, despite of the utilization of the EDM tools, the organizations may have minimal capabilities to precisely define, easily integrate and effectively aggregate the collected data for both internal insights and external communications.

The EDM tools utilized in the conventional approaches (as depicted in FIG. 1) may have the following hinderance:
- the EDM tools do not involve any mechanisms to handle incomplete and incorrect data present in the collected data, which creates a feedback loop of bad data into bad analytics. As the incorrect data is not corrected, its difficult to use the insights generated using such data for business processes of the organizations; and
- the EDM tools involve bespoke and siloed data models for performing the data management process on the collected data, as most of the collected data may be used only within the organization's business unit and collecting the data from the external sources may be a labor-intensive task meant for expensive data scientists. Thus, in the conventional approaches, minimal data is interoperable, which results in syntax, semantics, and structural interoperability issues.

BRIEF DESCRIPTION OF THE FIGURES

The embodiments disclosed herein will be better understood from the following detailed description with reference to the drawings, in which:

FIG. 9B is a flow diagram depicting the data profiling, according to the embodiments herein;

DETAILED DESCRIPTION OF EMBODIMENTS

Figure 1:
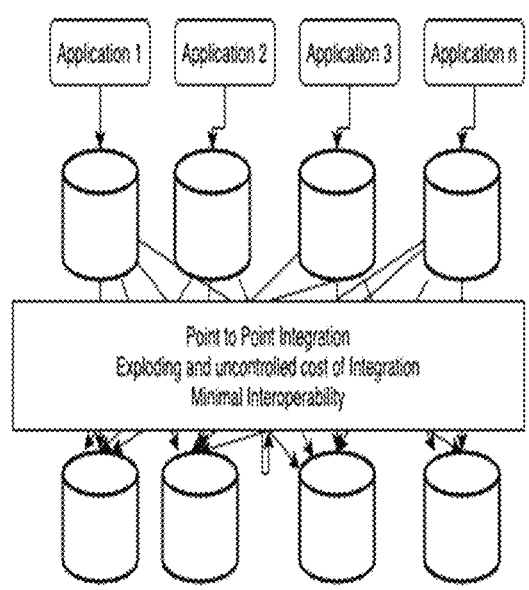
FIG. 1 is an example diagram depicting a data management process performed in conventional approaches.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for collecting data from a plurality of sources and linking the collected data to derive information and knowledge.

Embodiments herein disclose methods and systems for curating, cataloging, defining, and storing the collected data for informed data insights.

Embodiments herein disclose methods and systems for linking the collected data using semantic mapping.

Embodiments herein disclose methods and systems for data profiling for identifying and addressing data quality issues.

Embodiments herein disclose methods and systems for generating unify information by creating expressive data models, which have been semantically interlinked and interoperable with fully described data.

Embodiments herein provide methods and systems for de-duplication of data that is imported.

Referring now to the drawings, and more particularly to FIGS. 2 through 13, where similar reference characters denote corresponding features consistently throughout the figures, there are shown embodiments.

Figure 2:
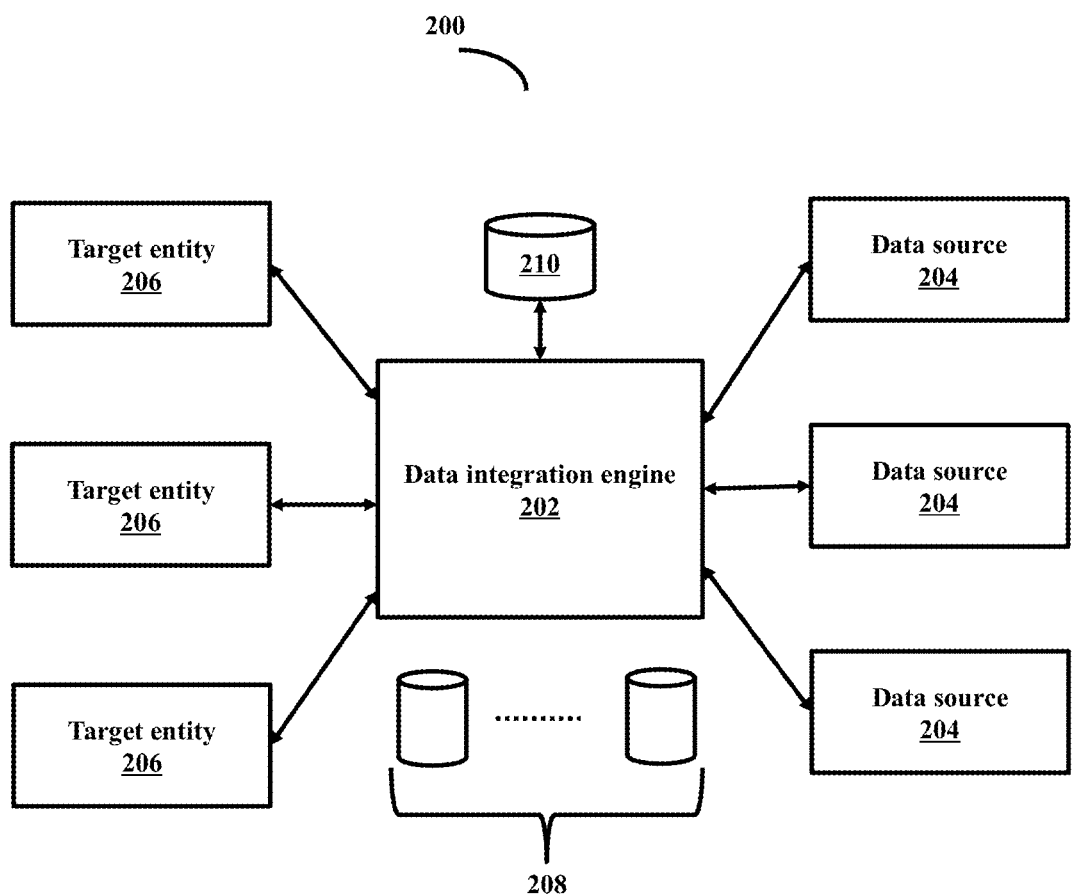
FIG. 2 depicts a data management system, according to embodiments as disclosed herein.

FIG. 2 depicts a data management system 200, according to embodiments as disclosed herein. The data management system 200 includes a data integration engine 202, (also be referred as Graphically linked and integrated data engine (Glide)), a plurality of data sources 204, and a plurality of target entities 206.

The data integration engine 202 may be maintained by one or more organizations/enterprises such as, but are not limited to, finance and banking organizations, capital markets, insurance companies, health care organizations, pharma industries, transportation companies, education institutes, telecom operators, customer care centers, digital business entities, and so on, for various purposes. The various purposes may include at least one of, but is not limited to, master data management, risk management, collateral management, revenue, billing and fee compression, data and information assets management, treasury and finance operations, regulatory reporting, data and information governance, data quality management, patient records management and journey, and so on. Also, the data integration engine 202 may be used for various applications such as, but are not limited to, neural network/Artificial Intelligence (AI) based applications, blockchain based applications, business use cases, data transformation based applications, semantic search based applications, data science, and so on.

The data integration engine 202 referred herein may be at least one of, but is not limited to, a cloud computing device, a server, a database, a computing device, and so on. The cloud computing device may be a part of a public cloud or a private cloud. The server may be at least one of, but is not limited to, a standalone server, a server on a cloud, or the like. The computing device may be, but are not limited to, a personal computer, a notebook, a tablet, desktop computer, a laptop, a handheld device, a mobile device, and so on. Also, the data integration engine 202 may be at least one of, a microcontroller, a processor, a System on Chip (SoC), an integrated chip (IC), a microprocessor based programmable consumer electronic device, and so on.

The data integration engine 202 may be connected to the plurality of data sources 204 and the plurality of target entities 206 through a communication network. Examples of the communication network may be, but are not limited to, the Internet, a wired network (a Local Area Network (LAN), a Controller Area Network (CAN) network, a bus network, Ethernet and so on), a wireless network (a Wi-Fi network, a cellular network, a Wi-Fi Hotspot, Bluetooth, Zigbee and so on) and so on. The data integration engine 202 may be connected to the plurality of data sources 204 for collecting the data. Examples of the plurality of data sources 204 may be, but are not limited to, user devices (used by one or more users/customers), application servers, web servers, mail servers, messaging servers, or any other device that stores the data. In an example, the plurality of data sources 204 may belong to a same organization of the data integration engine 202. In such a scenario, the data collected from the plurality of sources 204 may be the data published within the same organization. In another example, the plurality of data sources 204 may belong to different organizations. In such a scenario, the data collected from the plurality of data sources 204 may be the data published by different organizations. Thus, embodiments herein consider both the data that have been published internally and externally, which allows for an operation on top of unbounded data sources within and external to the respective organization. The plurality of target entities 206 may communicate with the data integration engine 202 for data management services. Examples of the plurality of target entities 206 may be, but are not limited to, the user device used by the users/customers, external servers, user devices of other organizations, or any other device that may be capable of communicating with the data integration engine 202 for accessing the data management services. In an example, the target entities 206 may be or may not be the data sources 204.

The data referred herein may include at least one of, but is not limited to, customer interactions, emails, text messages, social media posts (such as tweets, Facebook posts, Instagram posts, and so on), instant messaging (such as WhatsApp posts, Telegram posts, Facetime posts, Skype posts, Facebook, and so on), books, scientific publications, media (audio, videos, music, images, movies, or the like), information about medical products/services (drugs, genes, proteins, clinical trials, or the like), blogs, product reviews, call center logs, calendar entries, memo in terms of notes, and so on.

In an embodiment, the data integration engine 202 may be configured to industrialize the collection of the data, curating the data, and linking the data to derive information and knowledge. The information and knowledge may be utilized by the respective organization to deliver more complete business outcomes. In an example, the linked data may correspond to exposed, shared, and connected pieces of (structured) data, information and knowledge based on Uniform Resource Identifiers (URIs) and a resource description framework (RDF).

For creating the linked data, the data integration engine 202 may define the data models and assets based on at least one of, existing models within the organization, industry models, user defined rules, and so on. The industry models may include at least one of, but is not limited to, a number of industry specifications for finance and banking (FIBO), lineage and provenance, structural and syntax rules, and so on. In an embodiment, the data integration engine 202 defines the data models and assets by including data models, vocabulary, data quality rules, data mapping rules, or the like, for at least one of, a particular data industry, a data domain, a data subject area, or the like. The data models and assets may include at least one of, but is not limited to, the data models, data elements/objects, data terms, business entities, data shapes, data capture mapping rules/data mapping rules, Information Quality Management (IQM) rules/data quality rules, and so on.

The data models may be collections of entities and attributes for the given data domain and data subject area. Each Data model may be a set of statements describing the model as machine readable and human manageable set of "Linked data statements" that can evolve as the enterprise and business evolves.

The data element/object may be the smallest unit of a data-point, which may be uniquely identified by an identifier. Examples of the data elements may be, but are not limited to, a last Name, a first Name, date of birth, and so on.

The data terms may be business terms associated with a specific context. In an example, the data term may be a loan obligor, region of the body, region of the geographical area. The data element regions may have multiple business terms based on context. Also, the data concepts may have multiple views. For example, the data term "a health care provider" may be associated with the specific contexts such as, but are not limited to, a prescriber, a supplier, a clinical trial investigator, a patient, or the like. In current EDM tools each of the data terms may exit in a different data model, different data instantiations making it difficult to build customer 360 engagement applications.

The data entity depicts a specific concept within the organization. Examples of the data entity may be, but are not limited to, employee, customer, counterparty, product, material, and so on.

The data shape depicts constraints that have been placed on the target entity 206. The target entity 206 may be a querying entity, which requests the data integration engine 202 to provide the linked data for a particular query. In an example, the data shape may depict that "date of birth for an employee is mandatory and occurs only once and is a date".

The data capture mapping rules describe how a source data/queried data is mapped and integrated into the linked data.

The IQM rules may be data quality rules/data quality measurement (DQM) rules, which may be inferred from the data shape. Alternatively, the data integration engine 202 may define the IQM rules based on user/organization defined rules and the data shape.

On defining the data models and assets, the data integration engine 202 imports/collects the data from the plurality of data sources 204. In an example, the data integration engine 202 imports the data from the plurality of data sources 204 in one or more batches. In another example, the data integration engine 202 imports the data from the plurality of data sources 204 in real-time, wherein the imported data may be streaming data. The imported data may be in example formats such as, but are not limited to, an Extensible Markup Language (XML) format, a relational database (rdb) format, a JavaScript Object Notation (json) format, and so on. It is understood that the data may be imported in any other formats (including those described above).

The data integration engine 202 utilizes a linked data integration service (LDIS) to import the data from the plurality of data sources 204. The LDIS (for example: #ldis/#dcs) is a micro service, which may be executed/processed by the data integration engine 202 to import the data from the plurality of data sources 204. In an example, the data integration engine 202 processes the LDIS on demand to import the data from the plurality of data sources 204. In another example, the data integration engine 202 processes the LDIS periodically to import the data from the plurality of data sources 204. The data integration engine 202 may maintain one or more business data repositories (a tripe data store) 208 to store the imported data specific to the business in a form of RDF statements.

Once the data have been imported from the plurality of data sources 204, the data integration engine 202 curates the data in accordance with the defined data models and assets using the data mapping engine. Curating the data involves removing unwanted data or bad data from the imported data. In an example, the data integration engine 202 uses a machine learning model to curate the data. In another example, the data integration engine 202 curates the data using mapping linked rules to transform unconnected data to linked data statements. If the data is the connected data or the data in place, the data integration engine 202 uses metadata of the data to link distributed and federated non-graph stores to provide consistent experience to the users/data consumers.

On curating the data, the data integration engine 202 links the curated data and metadata in accordance with the defined data models and assets.

According to embodiments herein, method for linking the data involves either curating data, or semantic mapping. Semantic mapping is used for organizing and managing data to make it more accessible and useful. The data integration engine 202 learns to perform a Column-Type Annotation task using the features extracted from the column of a given relational table. The features are divided into character-wise statistics, column statistics, word embedding, and paragraph embedding. The data integration engine 202 compresses other features into a fixed-size embedding using a subnetwork except for column statistics features. The data integration engine 202 trains a two-fully connected layer network on both the embedding and column statistics features to predict a column type annotation for every dataset. The data integration engine 202 implements the semantic mapping using two methods.

In the first implementation, the data integration engine 202 splits the text data from the training dataset into two parts. In an example, the data integration engine 202 uses 80% of the collected data for training and uses the remaining 20% of the collected dataset for validating the trained neural network. To achieve a balanced training dataset, the data integration engine 202 uses weights or biases to minority classes to optimize the performance. The data integration engine 202 uses, but not limited to, Keras neural network library and the TensorFlow framework as the backend. In an example, the data integration engine 202 uses dropout as a regularizer after every neural network layer to generalize well to unseen data. In an example, the data integration engine 202 applies a dropout rate of 0.3 to allow embedding weights to be updated. In an example, the data integration engine 202 sets a dropout rate of 0.3 for the sub-networks. In an example, the data integration engine 202 performs the training with a mini-batch size of 32 for 50 epochs using a categorical cross-entropy loss function and Adam optimizer with an initial learning rate of 0.001. The data integration engine 202 saves snapshots of the network, known as checkpoints, for checking accuracy regularly, throughout the training process.

According to a second implementation of the semantic mapping process, the data integration engine 202 applies ensemble learning which combines the predictions of multiple learned models or architectures into one predictive model to enhance the stability, accuracy, and overall predictive performance. An ensemble approach is more stable, less noisy, and results in higher predictive performance than individual models. According to the embodiments herein, an ensemble of multiple models perform semantic detection using raw data. In an example, ensemble methods, such as, but not limited to, ExtraTreesClassifier and RandomForestClassifier are used to combine multiple decision trees to make a prediction. ExtraTreesClassifier builds a large number of decision trees using random splits and features, whereas RandomForestClassifier builds a smaller number of decision trees using the best splits and a subset of the features. The first step is model training. In model training, the data integration engine 202 trains multiple ExtraTreesClassifier and RandomForestClassifier models on the training set. Each model is trained on a random subset of the features and a random subset of the training data to ensure diversity among the models. The second step is model prediction. Each trained model is used to make a prediction on the test set. In the third step, the data integration engine 202 combines the predictions from all the ExtraTreesClassifier and RandomForestClassifier models using a voting approach to generate the final prediction. The VotingClassifier is used to implement this approach. The VotingClassifier takes a list of models and a voting strategy as input, and returns a single model that makes predictions by combining the predictions of the input models. The multiple models provide class scores in terms of probabilities. The data integration engine 202 combines the individual scores by averaging the probabilities and considers the class with the highest probability in the averaged vector.

The data integration engine 202 performs semantic mapping, according to the embodiments herein. For creation of semantic mapping, the data integration engine 202 checks if there are new source types to be mapped. If yes, the data integration engine 202 proceeds towards selecting source tables and/or columns. If no, the data integration engine 202 selects the existing source semantic mappings. The data integration engine 202 selects target mapping tables and/or columns and starts the semantic mapping process. Once completed, the data integration engine 202 displays mapping diagram of the results.

The data integration engine 202 also generates the metadata for the linked data. In an example, the metadata may be in a form of, a Resource Description Framework Schema (RDFS) label that is language specific, alternate labels, and definitions and taxonomy structures that are fully indexable and searchable as data. The data integration engine 202 stores the created linked data and metadata in the form of the RDF statements and the associated data in the one or more business data repositories 208. The created linked data may be fully interoperable and query able using Open standards. The linked data may be aligned to FAIR data principles. Once the linked data and the associated metadata is fully connected, enterprise micro applications such as, but are not limited to, linked Master Data Management (MDM), data quality observability, data lineage, data dictionaries, data vocabulary, data marketplace, and so on.

In an embodiment, the data integration engine 202 may be further configured to uniquely identify a point of entry of a new data and integrates the new data into the linked data. The data integration engine 202 integrates the new data into the linked data by creating a trusted knowledge graph/graph network of data nodes, thus the knowledge derived from the linked data continuously grows. In an embodiment, integrating the data into the linked data refers to a process of producing, connecting and consuming structured data on a web or a method to expose, share and connect pieces of (structured) data, information and knowledge based on the URIs and the RDF.

The data integration engine 202 receives a data query request from the user/target entity and builds/updates the linked data, according to the data query request. The data query request may include the new data. The data integration engine 202 identifies the entry point of the new data uniquely, and integrates the new data into the linked data, thereby providing the updated linked data. For integrating the new data into the linked data, the data integration engine 202 performs a semantic search to query the data in the linked data that matches with the new data. The semantic search involves interpreting statements in the linked data to find the data that matches with the new data.

In an embodiment, the data integration engine 202 may use at least one of, a neural network of connected data, various graph mining methods, or the like to perform the semantic search. In another embodiment, the data integration engine 202 may perform the semantic search by performing pattern matching queries using a SPARQL query statement. In another embodiment, the data integration engine 202 may use entity resolution capabilities to identify similar data and providing a scoring/score for the new data. The process of identifying and linking records or data that correspond to the same real-world entity or object is known as entity resolution, also known as record linkage. Embodiments herein use a variety of data-matching techniques, including string similarity measures, rule-based approaches, and machine learning. Based on a set of characteristics, the algorithms seek to identify likely matches between records. The data integration engine 202 may integrate the new data into the linked data, if the score assigned for the new data is above certain threshold or assign the activity to a data steward for resolving duplicates. On performing the semantic search, the data integration engine 202 integrates the new data into the linked data by creating the knowledge graph. The knowledge graph may be a large network of the data entities, and their sematic types, properties, and relationships between the data entities. The data integration engine 202 may maintain a graph database 210 to store the knowledge graph. The data integration engine 202 uses the knowledge graph and/or ontology models (stored in the graph database 210) to integrate information types of the received new data into an ontology and applies a reasoner to derive new knowledge. The ontology model may store a list of ontologies in a specific field from which the data may be imported. The ontologies provide pre-regulated terminologies, that the organizations may require in their regulation reports. The data integration engine 202 stores the updated linked data in the one or more business data repositories 208. The data integration engine 202 may derive the knowledge and information from the linked data to derive the outcome of the business process using the knowledge graph corresponding to the linked data.

In an embodiment, the data integration engine 202 may also be configured to measure a quality of data to determine data quality break and generating remedies to fix the determined data quality break. The data integration engine 202 generates a data quality index (DQI) by processing data quality requests associated with the linked data. The data integration engine 202 uses a microservice to process the data quality requests and generates the DQI, based on the IQM rules. The DQI may depict a Data Quality Index across the following dimensions of data quality such as, but are not limited to, completeness, validity, conformity, or the like. The IQM rules may be machine inferred rules and additional functional rules can be expressed as DQ rule statements. The data integration engine 202 automatically scans the data on-demand, on-change, or on-event (other events) generating a fresh score card each time so that DQI can be measured and monitored.

On generating the DQI, the data integration engine 202 triggers a data quality remedy workflow based on the DQI/IQM thresholds. When the DQI index is below the acceptable IQM threshold set by a data steward, the data integration engine 202 generates a data remediation work item/workflow for the data owners to correct the offending data items. Each correction or a set of corrections may trigger DQ score cards until the actual threshold is equal to the acceptable IQM threshold. The data integration engine 202 monitors the data quality remedy workflow for continuous data operation teams and generates remedies to fix the data quality break in the linked data. The data integration engine 202 communicates the remedies to at least one of, a data custodian, a data steward, a data owner, and so on for confirmation. On receiving the confirmation from at least one of, the data custodian, the data steward, the data owner, and so on, the data integration engine 202 applies the remedies to fix the data quality break.

In an embodiment, the data integration engine 202 may also be configured to provide an up-to-date canonical source of information in the form of linked data to the target entities 206, which can be trusted. The data integration engine 202 may also be configured to receive a query from the target entities 206 for the curated linked data through Application Programming Interface (API) based services. In such a scenario, the data integration engine 202 accesses the linked data from the one or more business data repositories 208 and provides the linked data and the associated metadata to the target entities 206. The data integration engine 202 may also be configured to receive the query from the target entities 206 to update the data through the API based services. In such a scenario, the data integration engine 202 accesses the linked data from the one or more business data repositories 208 and updates the linked data and the associated metadata based on the semantic search and the knowledge graph.

Thus, creating and updating linked data and providing the linked data to the user ensures that all data may be kept up-to-date with the minimum amount of fuss.

The data integration engine 202 manages all data assets (data models, data instances, data quality index, data mapping rules) as query-able linked data and the associated metadata that can be used in a publication layer for consumption. The data and the associated metadata are fully interoperable. For data sources that enterprise decides to keep in-place, the data integration engine 202 may only ingest the metadata allowing for federated and distributed data sources and services.

The data integration engine 202 provides the following data management services to the user for managing the data:
  data base services: the data integration engine 202 provides the user with a user interface (UI) to access the linked data and the collected data from the one or more business data repositories 208;
  data unification services: the data integration engine 202 provides the user with information about the data entities, vocabulary associated with the data, entity resolution, and so on;
  data stewardship services: the data integration engine 202 provides an interface for data owners and data managers to manually override data disputes, compare and merge duplicated records to create a master record, and so on;
  data profiling services: the data integration engine 202 infers and provides feedback to the user on concepts and vocabulary used in the data, which allows the user to perform the data mapping; According to the embodiments herein, the data integration engine 202 generates summary statistics and metadata reports for each dataset. The reports provide, but not limited to, detailed descriptive statistics, quantile statistics (for frequency distributions), histograms (for visualization), correlation structures between features, and flagging of duplicate and missing values. Descriptive statistics comprise mean, average, and the like.
  data capture services: the data integration engine 202 receives data sets from the user and maps the received datasets into the already defined ontologies using services of a GDUS (Glide Data Unification service), a GDPS (Glide data Profiling service), and a GDSS (Glide data steward service) for unification adjudication and data quality remediation;
  data quality engine service: the data integration engine 202 periodically and continuously measures the quality of data across seven dimensions of data quality without involving expensive and expansive data movement; and
  data quality remediation services: the data integration engine 202 enables the data custodian, the data steward, and the data owner to correct the data in real-time.

According to the embodiments herein, the data integration engine 202 performs data profiling for inferring and providing feedback to the user on concepts and vocabulary used in the data, which allows the user to perform the data mapping. Data profiling generates a detailed report on the data in a DataFrame. The report includes statistical descriptions of the data, visualizations of the data, and a summary of the quality of data. The data integration engine 202 receives a dataset that is to be profiled as an input. In an example, the dataset is a pandas DataFrame. Once the dataset is loaded, the data integration engine 202 generates a profile of the data. Data profile generation involves computing various statistics and visualizations that help in understanding the data. The statistics generated may include, but are not limited to, basic descriptive statistics, such as mean, median, standard deviation, quartiles, and the like, as well as more complex statistics, such as correlation matrices, histogram and box plots, distribution plots, and the like. The visualizations generated include, but are not limited to, scatterplots, heatmaps, and pair plots. On the generation of the data profile, the data integration engine 202 generates a detailed report summarizing the quality of the data. The report includes, but are not limited to, a summary of the data types, a summary of the number of missing values, a summary of the correlations between different variables, and a summary of any outliers, or anomalies in the data. Once the report is generated, the data integration engine 202 enables report visualization in different formats, such as, but not limited to, HTML, PDF, and JSON. The user can customize the report to include only the information that is relevant to the analysis.

The data integration engine 202 performs de-duplication of the imported data. The data integration engine 202 imports the data that has to be duplicated from various data sources, as explained above. The data integration engine 202 connects to several databases such as, but not limited to, MySQL, PostgreSQL, SQLite, and the like, and creates a dataset. The data integration engine 202 prepares the data. For preparing the data, the data integration engine uses processes such as, but not limited to, cleaning, standardizing, and structuring the data for consistency and accurate comparison. The data preparation can be completed manually, or automatically utilizing random methods. The data integration engine 202 uses record linkage after preparing the dataset. The record linkage compares pairs of records within the dataset and evaluates the possibility that they can be duplicates. The data integration engine 202 employs machine-learning techniques, such as, but not limited to, logical regression and support vector machines, to produce a similarity score between each pair of records. Once the similarity scores are calculated, the data integration engine 202 groups together records that are likely to be duplicated into clusters. Each cluster represents a set of records that are believed to refer to the same real-world entity. The user determines the clusters of potentially duplicate entries and selects which ones have to be merged or eliminated.

FIG. 2 shows exemplary blocks of the data management system 200, but it is to be understood that other embodiments are not limited thereon. In other embodiments, the data management system 200 may include less or more number of blocks. Further, the labels or names of the blocks are used only for illustrative purpose and does not limit the scope of the embodiments herein. One or more blocks can be combined together to perform same or substantially similar function in the data management system 200.

Figure 3:
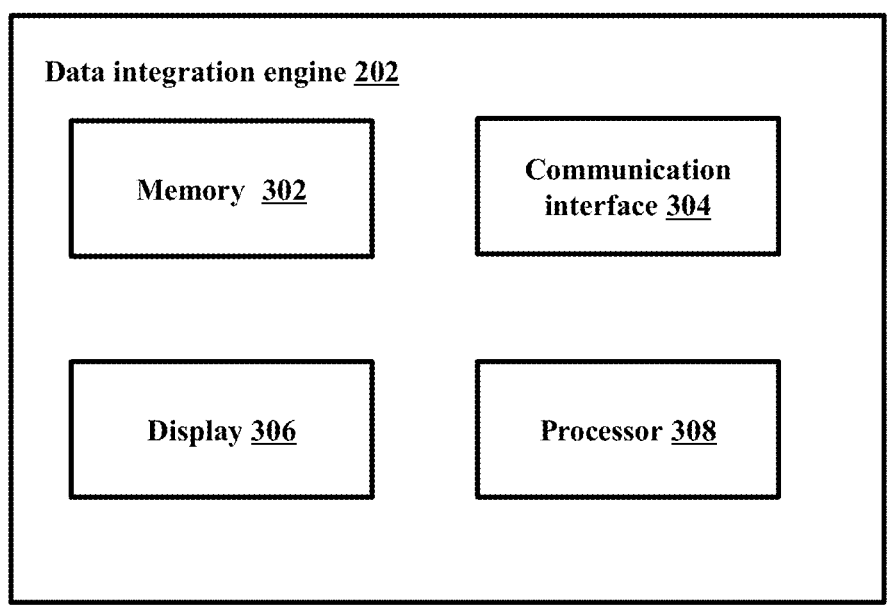
FIG. 3 is an example block diagram depicting various components of a data integration engine for data management and integration, according to embodiments as disclosed herein.

FIG. 3 is an example block diagram depicting various components of the data integration engine 202 for the data management and integration, according to embodiments as disclosed herein. The data integration engine 202 includes a memory 302, a communication interface 304, a display 306, and a processor 308.

The memory 302 may store at least one of, the data received from the plurality of data sources 204, the data query requests received from the target entities 206, the data models and assets, the linked data, the knowledge graph, the data quality remedy workflow, and so on. The memory 302 may also store a data manager 400, which may be executed by the processor 308 for the data management and integration. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 304 may be configured to enable the data integration engine 202 to communicate with the plurality of data sources 204, the plurality of target entities 206, and so on through the communication network.

The display 306 may be configured to allow an authorized user of the organization to interact with the data integration engine 202. The display 306 may also provide the UI for the user to display the linked data, the knowledge graph, the data entities, the vocabulary, and resolution of the data entities, and so on.

The processor 308 may be at least one of, but is not limited to, a single processer, a plurality of processors, multiple homogenous cores, multiple heterogeneous cores, multiple Central Processing Units (CPUs) of different kinds, and so on. The one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The processor 308 may be configured to collect the data from the plurality of sources 204, curate the data and create the linked data, to derive the knowledge and information. The processor 308 may also be configured to receive the data query requests including the data from the target entities 206 and integrate the data into the linked data. The processor 308 may also be configured to continuously determine the quality of the linked data and remediate if any data quality break in the linked data.

Figure 4:
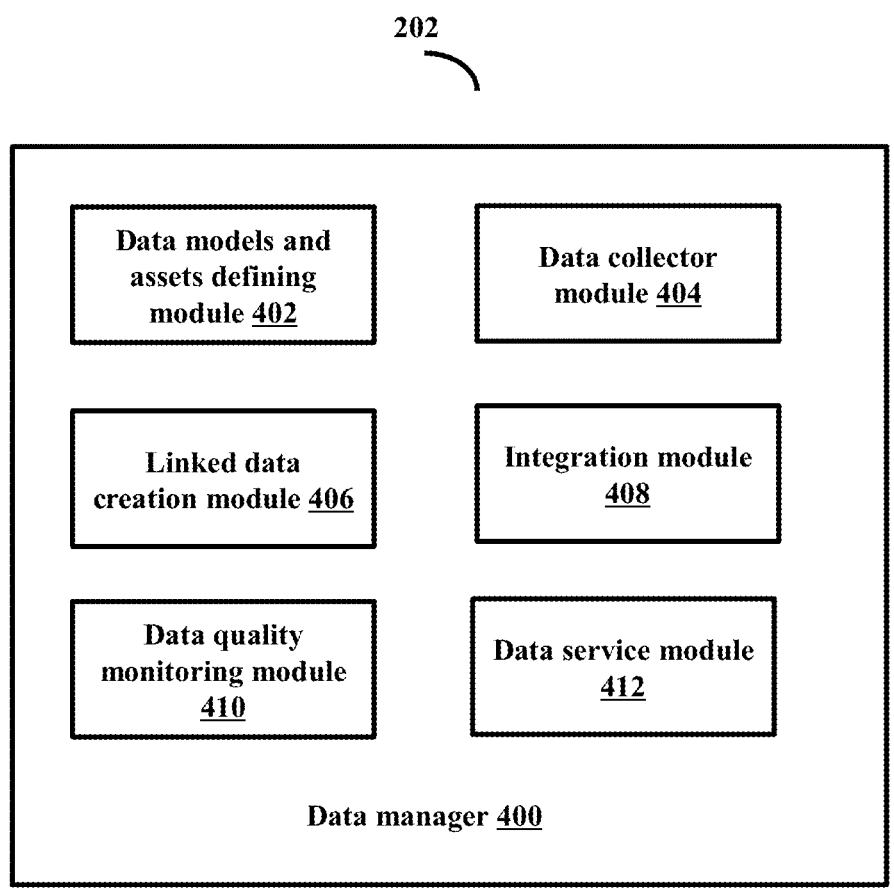
FIG. 4 depicts a data manager performable in the data integration engine for the data management and integration, according to embodiments as disclosed herein.

The processor 308 may execute the data manager 400 to manage the data and integrate the data into the linked data. As depicted in FIG. 4, the data manager 400 includes a data models and assets defining module 402, the data collector module 404, the linked data creation module 406, the integration module 408, the data quality monitoring module 410, and the data service module 412.

The data models and assets defining module 402 may be configured to define the data models and assets based on the existing models within the organization and/or the industry models and/or user defined rules.

The data collector module 404 may be configured to import the data from the plurality of data sources 204. The data collector module 404 uses the LDIS to import the data from the plurality of data sources 204 in the various formats. The data collector module 404 performs de-duplication of the imported data. The data collector module 404 imports the data that has to be duplicated from various data sources, as explained above. The data integration engine 202 connects to several databases such as, but not limited to, MySQL, PostgreSQL, SQLite, and the like, and creates a dataset. The data collector module 404 prepares the data. For preparing the data, the data collector module 404 uses processes such as, but not limited to, cleaning, standardizing, and structuring the data for consistency and accurate comparison. The data preparation can be completed manually, or automatically utilizing random methods. In an example, random methods include sampling, shuffling, missing value imputation, text normalization, and data standardization. Sampling involves randomly selecting a subset of records from the input data to be used for training and analysis. Sampling can help in reducing the processing time and memory requirements of de-duplication solution, particularly for large datasets. Shuffling involves randomly shuffling the order of records in the input data to prevent any bias or patterns that may be present in the original data. Shuffling helps to ensure that the de-duplication solution is training and analyzing records in a randomized order. Missing value imputation involves randomly filling in missing values in the input data using various methods, such as, but not limited to, mean imputation and regression imputation. Text normalization involves randomly normalizing text data in the input records to ensure consistency in formatting and spelling. For example, text normalization can convert all text to lowercase or standardize spelling variations, such as "US" and "USA". Data standardization involves randomly standardizing the data in the input records to ensure consistency in data types and formats. For example, data standardization can convert all date formats to a standard format, or ensure that all addresses are structured in a consistent manner. The data collector module 404 uses record linkage after preparing the dataset. The record linkage compares pairs of records within the dataset and evaluates the possibility that they can be duplicates. The data collector module 404 employs machine-learning techniques, such as, but not limited to, logical regression and support vector machines, to produce a similarity score between each pair of records. Once the similarity scores are calculated, the data collector module 404 groups together records that are likely to be duplicated into clusters. Each cluster represents a set of records that refer to the same real-world entity. For example, if there is a dataset of customer information and if some of the records belong to the same person, de-duplication groups the records belonging to the same person into a cluster. Therefore, each cluster represents a single real-world entity, i.e., the customer, in the given example. By grouping related records into clusters, de-duplication enables easier cleaning and analysis of the given data. Each cluster can be treated as a single entity and operations can be performed on the group as a whole, rather than manipulating each record individually. The user determines the clusters of potentially duplicate entries and selects which ones have to be merged or eliminated.

In an example, consider a dataset of customer information for a bank, including their name, address, and account number. However, due to data entry errors or inconsistencies, there may be duplicate records or records that refer to the same person but have slightly different information. De-duplication can be used to group these records into clusters based on their similarity. For example, if two records have the same name and address but different account numbers, de-duplication can group the records a cluster, each cluster representing a single customer, even if the customer information slightly differs across multiple records. By grouping related records into clusters, the bank can identify potential duplicates or inconsistencies in their data and clean it up more efficiently. They can also use the clusters to gain a better understanding of their customer base and perform targeted marketing or analysis on specific groups.

In yet another example, consider a trading firm that has a large database of historical stock market data, including information such as the stock symbol, trading volume, and price per share. However, due to data entry errors or inconsistencies, there may be duplicate records or records that refer to the same stock but have slightly different information. Using de-duplication, two records having the same stock symbol and trading volume but different prices per share can be grouped into a cluster. Each cluster represents a single stock, even if its price per share differs across multiple records. By grouping related records into clusters, i.e., by using de-duplication, according to the embodiments herein, the trading firm can identify potential duplicates or inconsistencies in their data and clean it up more efficiently. The clusters can be used to perform analysis on specific stocks and gain insights into market trends or anomalies. For example, the trading volume and price per share of a particular stock can be compared across different clusters to see if there are any patterns or correlations.

According to the embodiments herein, the linked data creation module 406 may be configured to curate the data and create the linked data, in accordance with the data models and assets defined by the data models and assets defining module 402. The linked data creating module 406 stores the linked data in the memory 302 and/or the one or more business data repositories 208. The linked data creation module 406 performs semantic mapping. Semantic mapping is used for organizing and managing data to make it more accessible and useful. The linked data creation module 406 learns to perform a Column-Type Annotation task using the features extracted from the column of a given relational table. The features are divided into character-wise statistics, column statistics, word embedding, and paragraph embedding. The linked data creation module 406 compresses other features into a fixed-size embedding using a subnetwork except for column statistics features. The linked data creation module 406 trains a two-fully connected layer network on both the embedding and column statistics features to predict a column type annotation for every dataset. The linked data creation module 406 implements the semantic mapping using two methods.

In the first implementation, the linked data creation module 406 splits the text data from the training dataset into two parts. In an example, The linked data creation module 406 uses 80% of the collected data for training and uses the remaining 20% of the collected dataset for validating the trained neural network. To achieve a balanced training dataset, the linked data creation module 406 uses weights or biases to minority classes to optimize the performance. The linked data creation module 406 uses, but not limited to, Keras neural network library and the TensorFlow framework as the backend. In an example, the linked data creation module 406 uses dropout as a regularizer after every neural network layer to generalize well to unseen data. In an example, the linked data creation module 406 applies a dropout rate of 0.3 to allow embedding weights to be updated. In an example, the linked data creation module 406 sets a dropout rate of 0.3 for the sub-networks. In an example, the data integration engine 202 performs the training with a mini-batch size of 32 for 50 epochs using a categorical cross-entropy loss function and Adam optimizer with an initial learning rate of 0.001. The linked data creation module 406 saves snapshots of the network, known as checkpoints, for checking accuracy regularly, throughout the training process.

According to a second implementation of the semantic mapping process, the linked data creation module 406 applies ensemble learning which combines the predictions of multiple learned models or architectures into one predictive model to enhance the stability, accuracy, and overall predictive performance. An ensemble approach is more stable, less noisy, and results in higher predictive performance than individual models. According to the embodiments herein, an ensemble of multiple models perform semantic detection using raw data. The multiple models provide class scores in terms of probabilities. The linked data creation module 406 combines the individual scores by averaging the probabilities and considers the class with the highest probability in the averaged vector.

The integration module 408 may be configured to receive the data query request including the data from the target entity 206 and integrate the data into the linked data. The integration module 408 may integrate the data into the linked data by performing the semantic action and creating the knowledge graph.

The integration module 408 performs the semantic search to find the data in the linked data that matches with the received data, using the neural network. In an embodiment, the neural network comprises a plurality of layers. Each layer has a plurality of weight values and performs a layer operation through calculation of a previous layer and an operation of a plurality of weights/coefficients. Examples of the neural network include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep Q-network, and so on. The neural network may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the neural network may vary based on the type of the neural network. In an example, the neural network may include an input layer, an output layer, and a hidden layer. The input layer receives an input and forwards the received input to the hidden layer. The hidden layer transforms the input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The neural network may be trained using at least one learning method to perform the semantic search. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the processor 308. The processor 308 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors perform the semantic search in accordance with a predefined operating rule of the neural network, respectively, stored in the non-volatile memory and the volatile memory. The predefined operating rules of the neural network are provided through training the modules using the learning method.

Here, being provided through learning means that, by applying the learning method to a plurality of learning data, a predefined operating rule or AI model of a desired characteristic is made. The semantic search may be performed in the data integration engine 202 itself in which the learning according to an embodiment is performed, and/or may be implemented through a separate server/system.

On performing the semantic search, the integration module 408 creates the knowledge graph for integrating the received data into the linked data based on the semantic search and the ontology model stored in the graph database 210. Thereby, updating the linked data. The integration module 408 stores the linked data in the memory 302 and/or the one or more business data repositories 208 and stores the knowledge graph in the memory 302 and/or the graph database 210.

The data quality monitoring module 410 may be configured to measure the quality of data to determine the data quality break in the linked data and generate remedies to fix the determined data quality break in the linked data. The data quality monitoring module 410 generates the DQI by processing data quality requests associated with the linked data, based on the IQM rules. The DQI may depict any data quality break in the linked data. On generating the DQI, the data quality monitoring module 410 generates the data quality remedy workflow based on the IQM rules to remediate the data quality break. The data quality monitoring module 410 monitors the data quality remedy workflow for continuous data operation teams to fix and remediate the data quality break in the linked data.

The data service provider 412 may be configured to receive the query from the target entity 206 for the linked data and the associated metadata and provide the up-to-date canonical source of information in the form of linked data and the associated metadata to the target entity 206.

FIGS. 3 and 4 show exemplary blocks of the data integration engine 202, but it is to be understood that other embodiments are not limited thereon. In other embodiments, the data integration engine 202 may include less or more number of blocks. Further, the labels or names of the blocks are used only for illustrative purpose and does not limit the scope of the embodiments herein. One or more blocks can be combined together to perform same or substantially similar function in the data integration engine 202.

Figure 5:
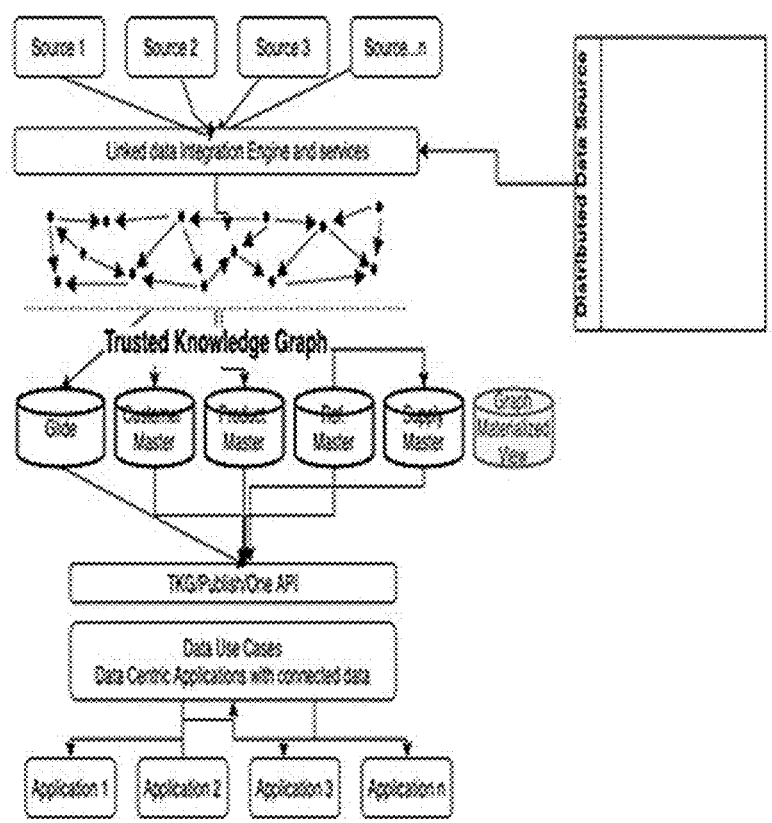
FIG. 5 is an example conceptual diagram depicting the data management and integration, according to embodiments as disclosed herein.

FIG. 5 is an example conceptual diagram depicting the data management and integration, according to embodiments as disclosed herein.

The data integration engine 202/Glide 202 collects the data from the plurality of data sources 204, curate the data and create the linked data, to derive the knowledge and information. The data integration engine 202 also receives the data query requests including the data from the target entities 206 and integrate the data into the linked data. The data integration engine 202 also continuously determines the quality of the linked data and remediate if any data quality break in the linked data.

The linked data may be a fully connected and interoperable data cloud available via open and community standards. The derived knowledge and information from the linked data may be represented in the knowledge graph/trusted knowledge graph/glide virtual graph. The glide virtual graph capability allows for the companies/organizations to enhance current data investments by allowing for data in place and allowing for the data integration engine/Glide 202 to co-exist with the existing data sources. The data integration engine 202/Glide 202 also harvests minimal metadata from relational stores supporting MY SQL Server, Oracle, Sybase, and others, and No SQL databases, which allows for receiving the queries for the linked across the Glide graph store/graph database 210 and Non-graph stores seamlessly.

Figure 6:
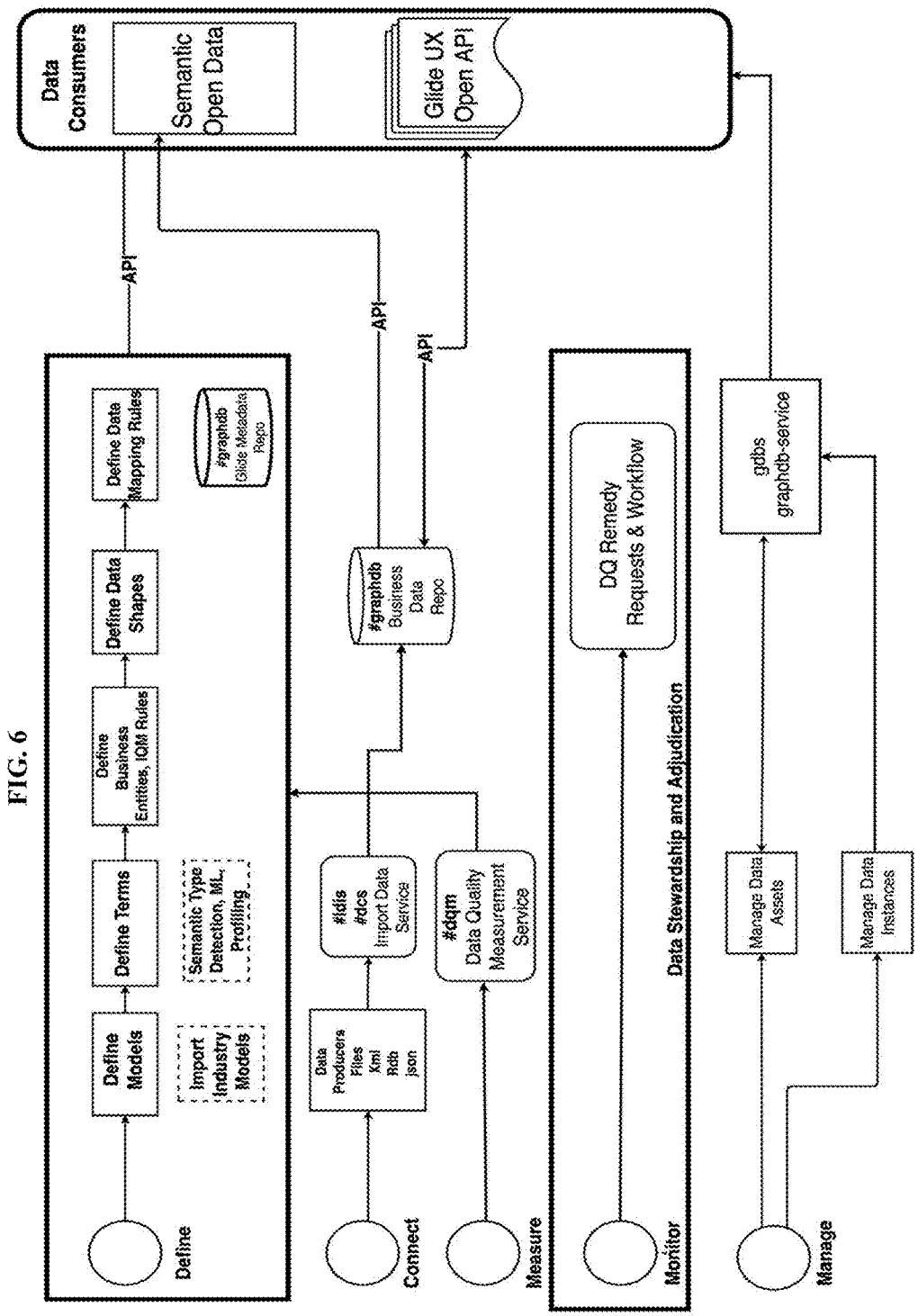
FIG. 6 is an example diagram depicting creation of linked data and managing the linked data, according to embodiments as disclosed herein.

FIG. 6 is an example diagram depicting creation of the linked data and managing the linked data, according to embodiments as disclosed herein.

As depicted in FIG. 6, the data integration engine 202 defines the data models and assets, which may include at least one of, the data models, the data entities, the data elements, the data terms, the data shape, the IQM rules, and so on. The data integration engine 202 imports the data from the plurality of data sources 204 using the LDIS in the various formats. The data integration engine 202 curates the collected data and links the data, in accordance with the defined data models and assets. The data integration engine 202 creates the metadata for the linked data. The data integration engine 202 stores the linked data and the associated metadata in the one or more business data repositories 208.

The data integration engine 202 processes the data quality requests associated with the linked data and generates the DQI, which indicates the data quality break in the linked data. The data integration engine 202 forms the data quality remedy workflow including the data quality break and continuously monitors the data quality remedy workflow to generate the remedies for fixing the data quality break in the linked data. The data integration engine 202 also manages the data model and assets, and the data instances using the graph database 210 and the API.

Figure 7:
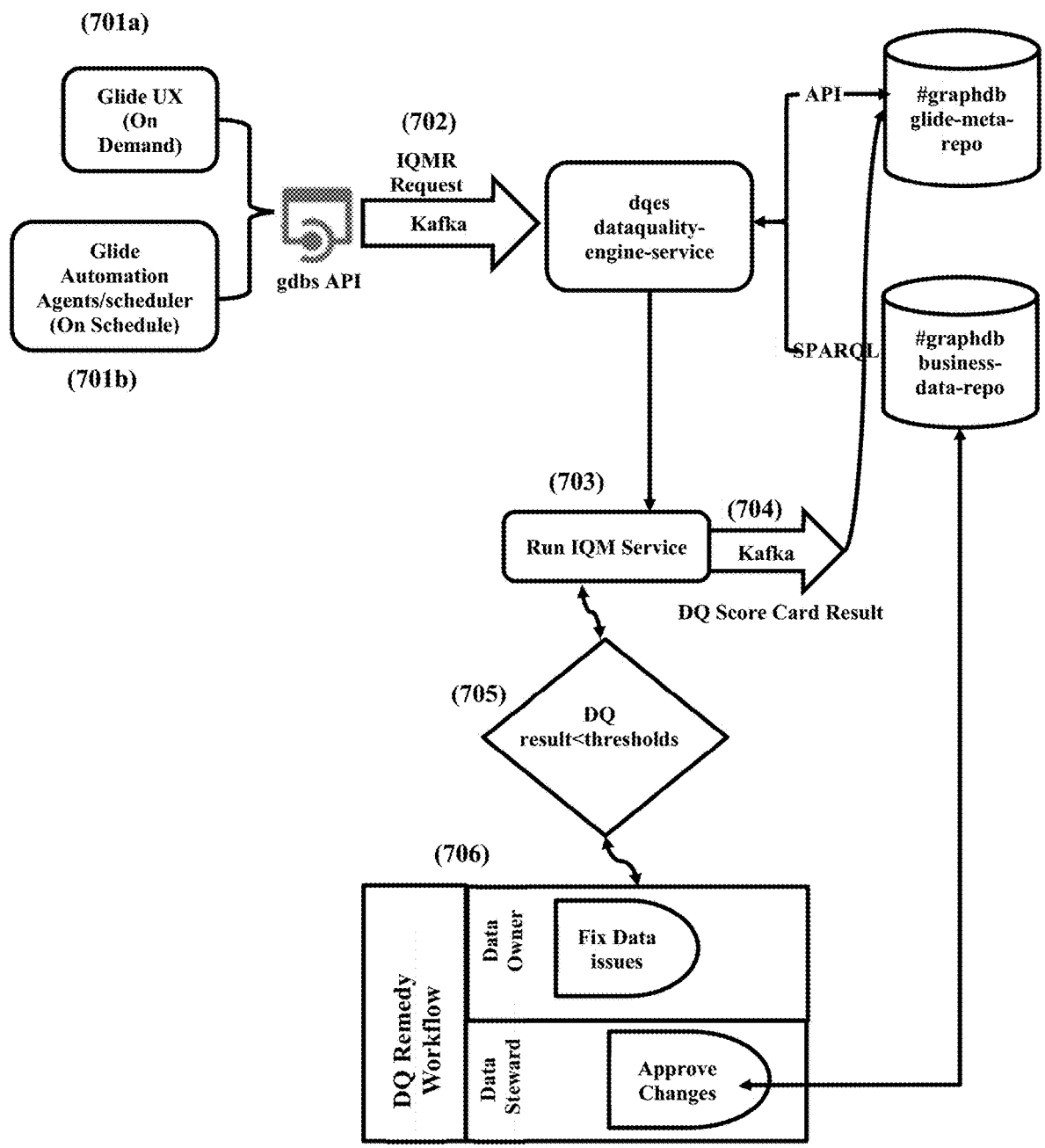
FIG. 7 is an example flow diagram depicting a process of executing Information Quality Management (IQM) rules to determine a quality of the linked data, according to embodiments as disclosed herein.

FIG. 7 is an example flow diagram depicting a process of executing the IQM rules to determine the quality of the linked data, according to embodiments as disclosed herein.

The data integration engine 202 may execute the IQM rules to determine the quality of the linked data. In an example, the data integration engine 202 receives (at step 701a) a request from the user/authorized user of the organization to determine the quality of the linked data (i.e., on demand). In another example, the data integration engine 202 (at step 701b) identifies the update of the linked data (on schedule or on change). At step 702, the data integration engine 202 provides an IQM request to the data quality monitoring module 410. On receiving the IQM request, at step 703, the data quality monitoring module 410 fetches the linked data and the IQM rules from the one or more business data repositories 208. At step 704, the data quality monitoring module 410 generates the DQI/data quality (DQ) score card by executing the IQM rules on the linked data. At step 705, the data quality monitoring module 410 checks if the DQI is lesser than a threshold. (i.e., the DQI/IQM threshold, which may be defined at data entity/data Quality rule level by a data owner, data steward or data custodian based on permissions defined for the role). The DQI lesser than the threshold depicts the data quality break in the linked data. If the DQI is lesser than the threshold, at step 706, the data quality monitoring module 410 generates the data quality remedy workflow and continuously monitors the data quality remedy workflow to generate the remedies for fixing the data quality break in the linked data. The data quality monitoring module 410 allows at least one of, the data owner, the data steward, and so on, to approve the generated remedies, and to fix the data quality break by applying the approved remedies.

Figure 8:
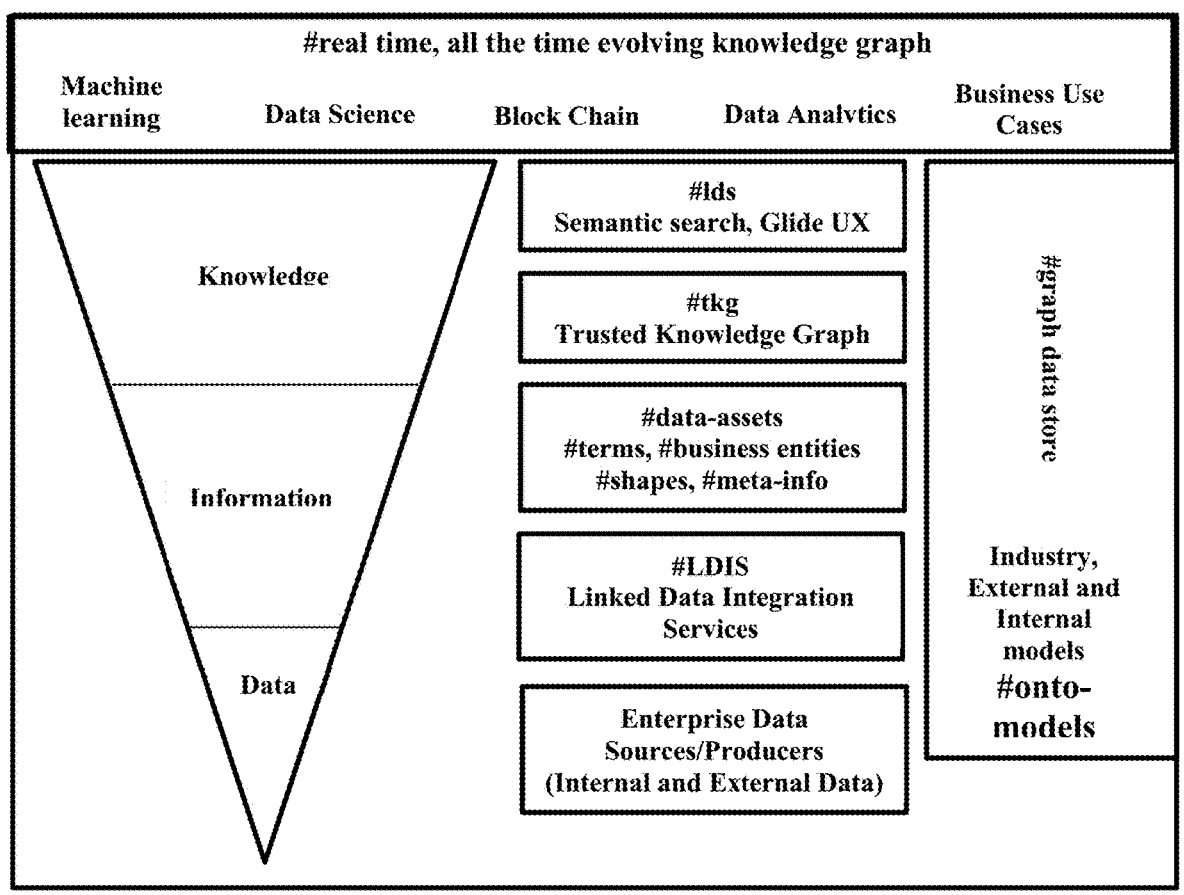
FIG. 8 is an example diagram depicting an integration of the data into the linked data, according to embodiments as disclosed herein.

FIG. 8 is an example diagram depicting the integration of the data into the linked data, according to embodiments as disclosed herein.

The data integration engine 202 receives the data query request from the target entity 206 and builds/updates the linked data, according to the data query request. The data query request may include the data. The data integration engine 202 identifies the entry point of the data uniquely, and integrates the data into the linked data, thereby providing the updated linked data. For integrating the data into the linked data, the data integration engine 202 performs the semantic search to query the data in the linked data that matches with the received data. On performing the semantic search, the data integration engine 202 integrates the data into the linked data by creating the knowledge graph. The knowledge graph may be the large network of the data entities, and their semantic types, properties, and relationships between the data entities. The data integration engine 202 uses the knowledge graph and/or the ontology models to integrate information types of the received data into the ontology and applies the reasoner to derive the knowledge. The ontology model may store the list of ontologies in the specific field from which the data may be imported. The ontologies provide pre-regulated terminologies, that the organizations may require in their regulation reports. The data integration engine 202 updates the metadata associated with the updated linked data. The data integration engine 202 stores the updated linked data and the associated metadata in the one or more business data repositories 208. The data integration engine 202 may derive the knowledge and information from the linked graph to create the business outcomes/applications/reports.

Figure 9:
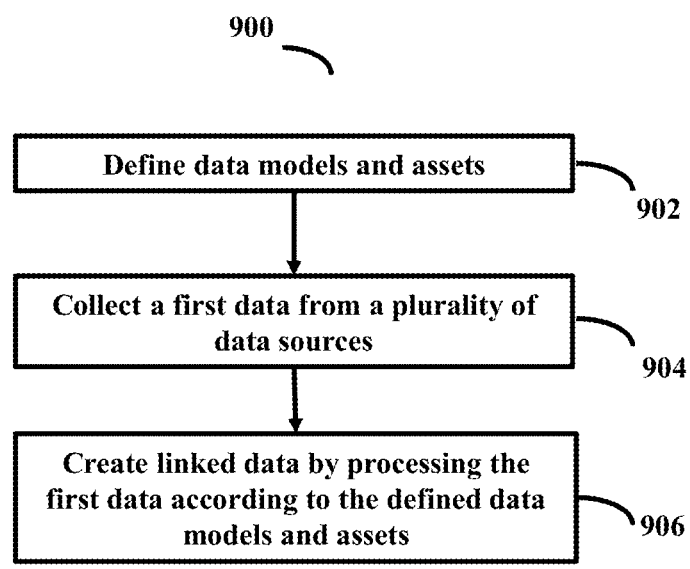
FIG. 9 is a flow diagram depicting a method for the data management and integration, according to embodiments as disclosed herein.

FIG. 9 is a flow diagram 900 depicting a method for the data management and integration, according to embodiments as disclosed herein.

At step 902, the method includes defining, by the data integration engine 202, the data models and assets. The data integration engine 202 defines the data models and assets based on at least one of, the existing data models and assets of the organization, the industry models, and the user defined rules.

At step 904, the method includes collecting, by the data integration engine 202, the data/first data, from the plurality of data sources 204. The data integration engine uses the LDIS to collect the first data from the plurality of data sources in the various formats.

At step 906, the method includes creating, by the data integration engine 202, the linked data by processing the first data according to the defined data models and assets. The various actions in method 900 may be performed in the order presented, in a different order or simultaneously. Further, in some embodiments, some actions listed in FIG. 9 may be omitted.

Figure 9A:
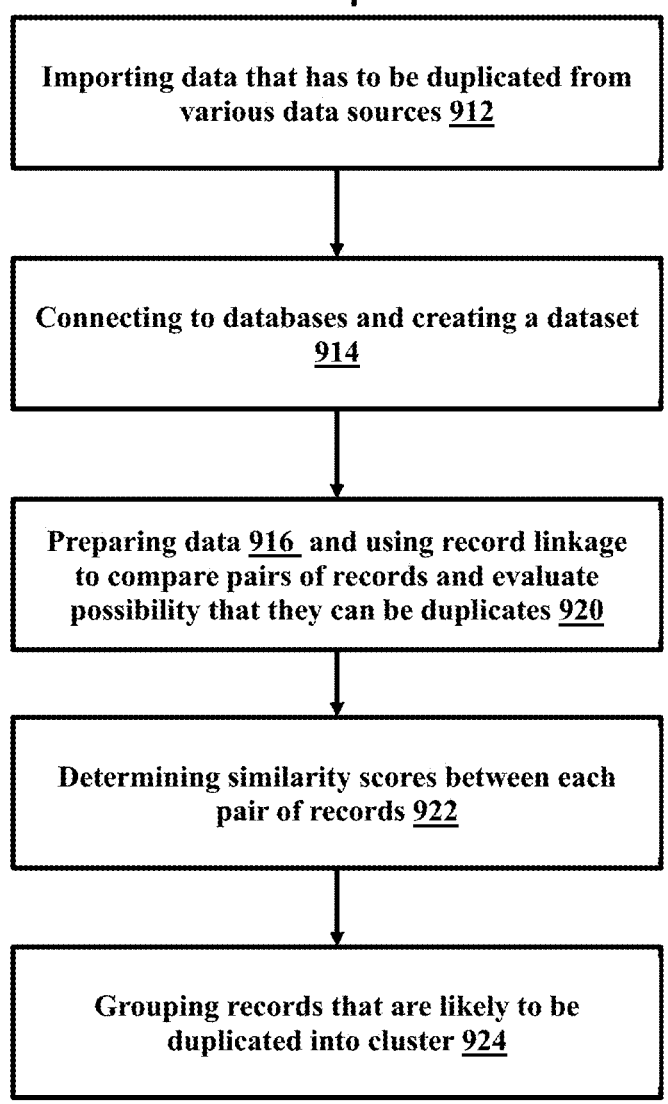
FIG. 9A illustrates a flow diagram depicting the method steps involved in de-duplication of data, according to the embodiments herein.

FIG. 9A illustrates a flow diagram 910 depicting the method steps involved in de-duplication of data, according to the embodiments herein. At step 912, the data collector module 404 imports the data that has to be duplicated from various data sources, as explained above. At step 914, the data collector module 404 connects to several databases such as, but not limited to, MySQL, PostgreSQL, SQLite, and the like, and creates a dataset. At step 916, the data collector module 404 prepares the data. For preparing the data, at step 918, the data collector module 404 uses processes such as, but not limited to, cleaning, standardizing, and structuring the data for consistency and accurate comparison. The data preparation can be completed manually, or automatically utilizing random methods. At step 920, the data collector module 404 uses record linkage after preparing the dataset. The record linkage compares pairs of records within the dataset and evaluates the possibility that they can be duplicates. At step 922, the data collector module 404 employs machine-learning techniques, such as, but not limited to, logical regression and support vector machines, to produce a similarity score between each pair of records. Once the similarity scores are calculated, at step 924, the data collector module 404 groups together records that are likely to be duplicated into clusters. Each cluster represents a set of records that are believed to refer to the same real-world entity. At step 926, the data collector module 404 provides the cluster to the user so that the user can determine the clusters of potentially duplicate entries and can select which ones have to be merged or eliminated.

FIG. 9B is a flow diagram 930 depicting the data profiling for inferring and providing feedback to the user on concepts and vocabulary used in the data, which allows the user to perform the data mapping, according to the embodiments herein. Data profiling generates a detailed report on the data in a DataFrame. The report includes statistical descriptions of the data, visualizations of the data, and a summary of the quality of data. At step 932, the data integration engine 202 receives a dataset that is to be profiled as an input. In an example, the dataset is a pandas DataFrame. Once the dataset is loaded, at step 934, the data integration engine 202 generates a profile of the data. On the generation of the data profile, at step 936, the data integration engine 202 generates a detailed report summarizing the quality of the data. Once the report is generated, at step 938, the data integration engine 202 enables report visualization in different formats, such as, but not limited to, HTML, PDF, and JSON. The user can customize the report to include only the information that is relevant to the analysis.

Figure 10:
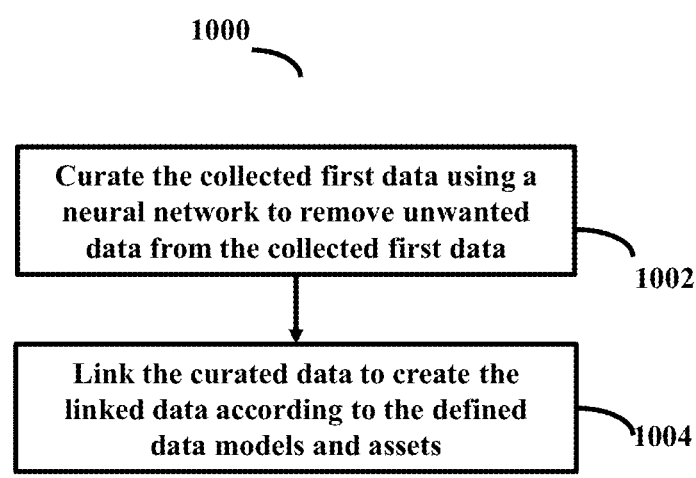
FIG. 10 is a flow diagram depicting a method for linking the data, according to embodiments as disclosed herein.

FIG. 10 is a flow diagram 1000 depicting a method for linking the data, according to embodiments as disclosed herein.

At step 1002, the method includes curating, by the data integration engine 202, the collected first data using the neural network to remove the unwanted/bad data from the collected first data.

At step 1004, the method includes linking, by the data integration engine 202, the curated data to create the linked data according to the defined data models and assets. The linked data corresponds to exposed, shared, and connected pieces of structured data, information and knowledge based on the URIs and the RDF. The various actions in method 1000 may be performed in the order presented, in a different order or simultaneously. Further, in some embodiments, some actions listed in FIG. 10 may be omitted.

Figure 10A:
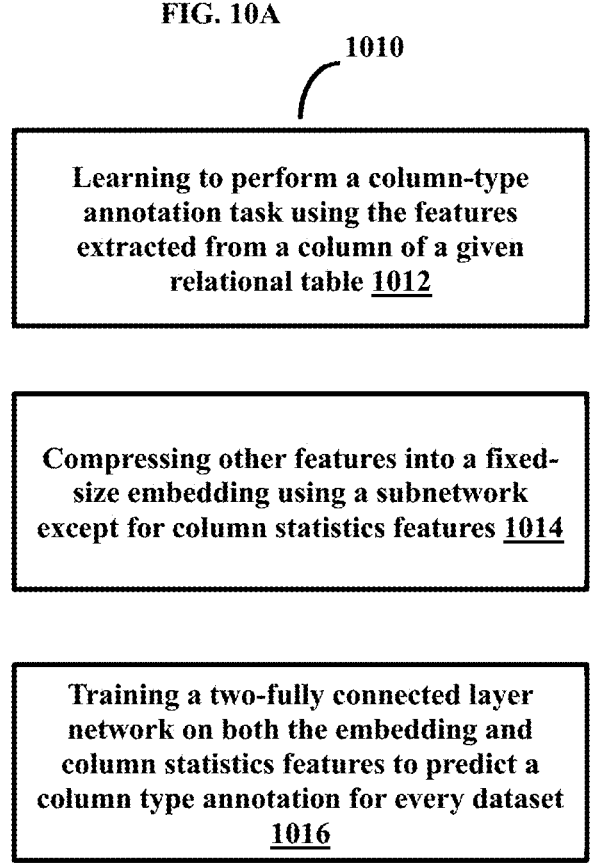
FIG. 10A illustrates a flowchart depicting a method for linking the data by semantic mapping, according to embodiments herein.

FIG. 10A illustrates a flowchart 1010 depicting a method for linking the data by semantic mapping, according to embodiments herein. At step 1012, the data integration engine 202 learns to perform a Column-Type Annotation task using the features extracted from the column of a given relational table. The features are divided into character-wise statistics, column statistics, word embedding, and paragraph embedding. At step 1014, the data integration engine 202 compresses other features into a fixed-size embedding using a subnetwork except for column statistics features. At step 1016, the data integration engine 202 trains a two-fully connected layer network on both the embedding and column statistics features to predict a column type annotation for every dataset. The data integration engine 202 implements the semantic mapping using two methods.

Figure 10B:
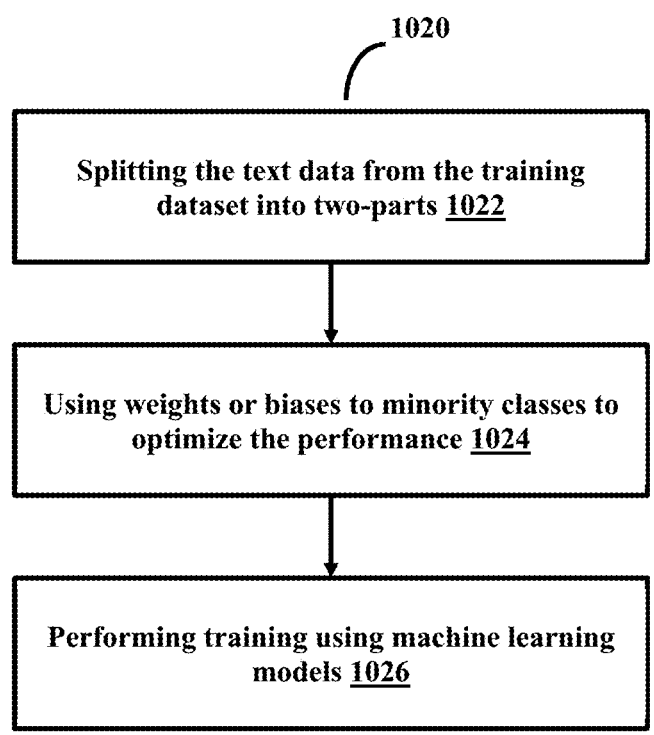
FIG. 10B shows a flow diagram of the first implementation of the semantic mapping, according to the embodiments herein.

FIG. 10B shows a flow diagram 1020 of the first implementation of the semantic mapping, according to the embodiments herein. At step 1022, the data integration engine 202 splits the text data from the training dataset into two parts. In an example, the data integration engine 202 uses 80% of the collected data for training and uses the remaining 20% of the collected dataset for validating the trained neural network. At step 1024, to achieve a balanced training dataset, the data integration engine 202 uses weights or biases to minority classes to optimize the performance. The data integration engine 202 uses, but not limited to, Keras neural network library and the TensorFlow framework as the backend. In an example, the data integration engine 202 uses dropout as a regularizer after every neural network layer to generalize well to unseen data. In an example, the data integration engine 202 applies a dropout rate of 0.3 to allow embedding weights to be updated. In an example, the data integration engine 202 sets a dropout rate of 0.3 for the sub-networks. At step 1026, the data integration engine 202 performs training using machine learning models. In an example, the data integration engine 202 performs the training with a mini-batch size of 32 for 50 epochs using a categorical cross-entropy loss function and Adam optimizer with an initial learning rate of 0.001. The data integration engine 202 saves snapshots of the network, known as checkpoints, for checking accuracy regularly, throughout the training process.

Figure 10C:
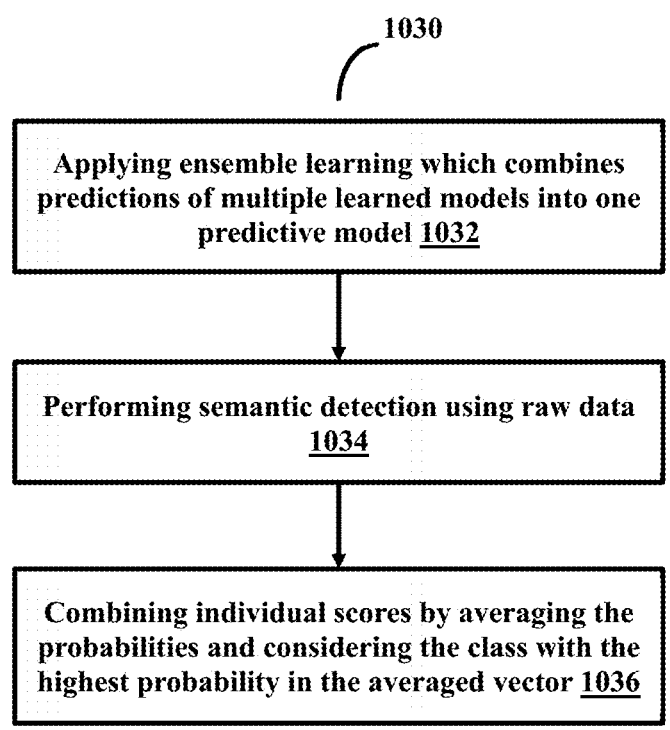
FIG. 10C illustrates a flow diagram depicting the second implementation of the semantic mapping process, according to the embodiments herein.

FIG. 10C illustrates a flow diagram 1030 depicting the second implementation of the semantic mapping process, according to the embodiments herein. At step 1032, the data integration engine 202 applies ensemble learning which combines the predictions of multiple learned models or architectures into one predictive model to enhance the stability, accuracy, and overall predictive performance. An ensemble approach is more stable, less noisy, and results in higher predictive performance than individual models. At step 1034, an ensemble of multiple models perform semantic detection using raw data. The multiple models provide class scores in terms of probabilities. At step 1036, the data integration engine 202 combines the individual scores by averaging the probabilities and considers the class with the highest probability in the averaged vector.

Figure 10D:
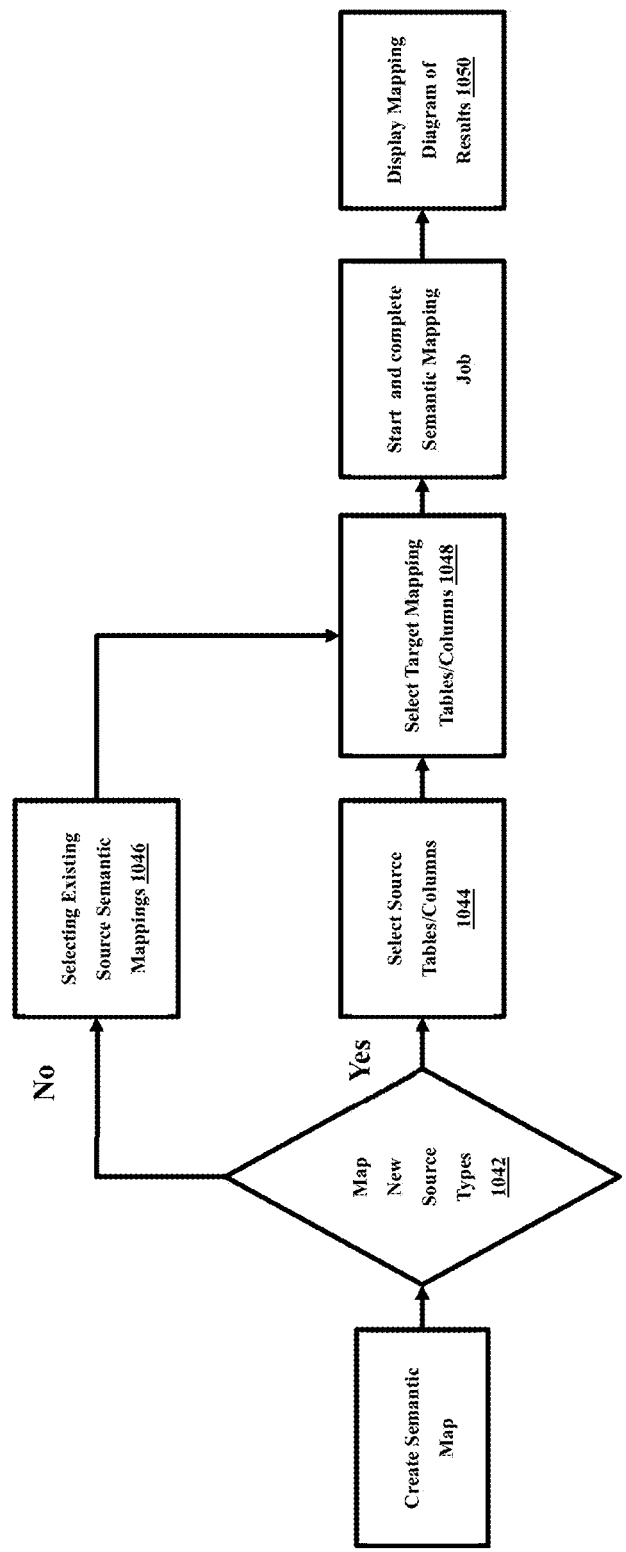
FIG. 10D is a flow diagram showing the overall process flow of semantic mapping, according to the embodiments herein.

FIG. 10D is a flow diagram 1040 showing the overall process flow of semantic mapping, according to the embodiments herein. For creation of semantic mapping, at step 1042, the data integration engine 202 checks if there are new source types to be mapped. If yes, at step 1044, the data integration engine 202 proceeds towards selecting source tables and/or columns. If no, at step 1046, the data integration engine 202 selects the existing source semantic mappings. At step 1048, the data integration engine 202 selects target mapping tables and/or columns and starts the semantic mapping process. Once completed, at step 1050, the data integration engine 202 displays mapping diagram of the results.

Figure 11:
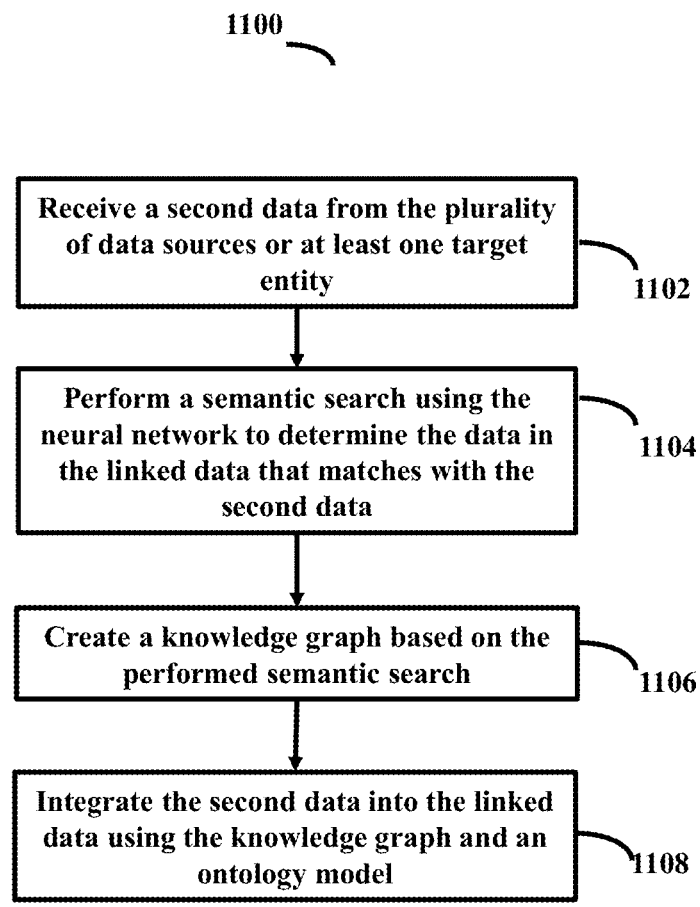
FIG. 11 is a flow diagram depicting a method for integrating the data into the linked data, according to embodiments as disclosed herein.

FIG. 11 is a flow diagram 1100 depicting a method integrating the data into the linked data, according to embodiments as disclosed herein.

At step 1102, the method includes receiving, by the data integration engine 202, the new data/second data from the plurality of data sources 204 or the at least one target entity 206.

At step 1104, the method includes performing, by the data integration engine 202, the semantic search using the neural network to determine the data in the linked data that matches with the second data.

At step 1106, the method includes creating, by the data integration engine 202, the knowledge graph based on the performed semantic search. The knowledge graph is a large network of the data entities, and associated semantic types and properties, and relationships between the data entities.

At step 1108, the method includes integrating, by the data integration engine 202, the second data into the linked data using the knowledge graph and the ontology model. The various actions in method 1100 may be performed in the order presented, in a different order or simultaneously. Further, in some embodiments, some actions listed in FIG. 11 may be omitted.

Figure 12:
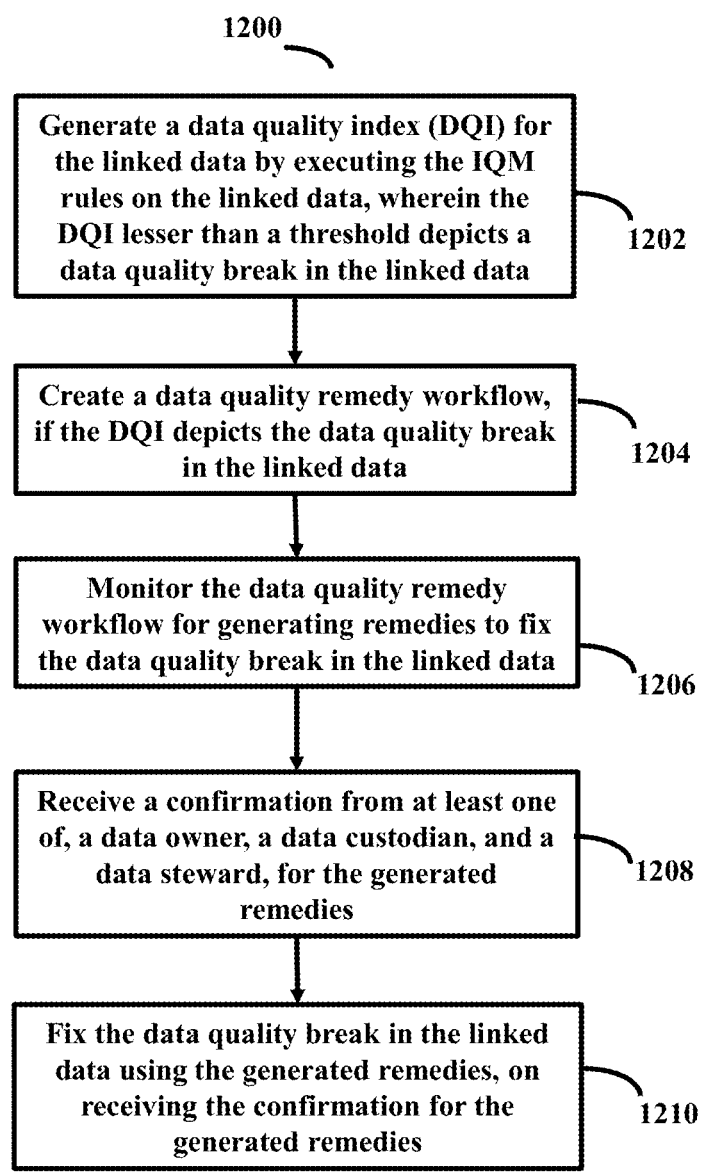
FIG. 12 is a flow diagram depicting a method for determining the quality of the linked data, according to embodiments as disclosed herein.

FIG. 12 is a flow diagram 1200 depicting a method for determining the quality of the linked data, according to embodiments as disclosed herein.

At step 1202, the method includes generating, by the data integration engine 202, the DQI for the linked data by executing the IQM rules on the linked data. The DQI lesser than the threshold depicts the data quality break in the linked data. At step 1204, the method includes creating, by the data integration engine 202, the data quality remedy workflow, if the DQI depicts the data quality break in the linked data.

At step 1206, the method includes monitoring, by the data integration engine 202, the data quality remedy workflow for generating the remedies to fix the data quality break in the linked data. At step 1208, the method includes receiving, by the data integration engine 202, the confirmation from at least one of, the data owner, the data custodian, and the data steward, for the generated remedies. At step 1210, the method includes fixing, by the data integration engine 202, the data quality break in the linked data using the generated remedies, on receiving the confirmation for the generated remedies. The various actions in method 1000 may be performed in the order presented, in a different order or simultaneously. Further, in some embodiments, some actions listed in FIG. 12 may be omitted.

Figure 13:
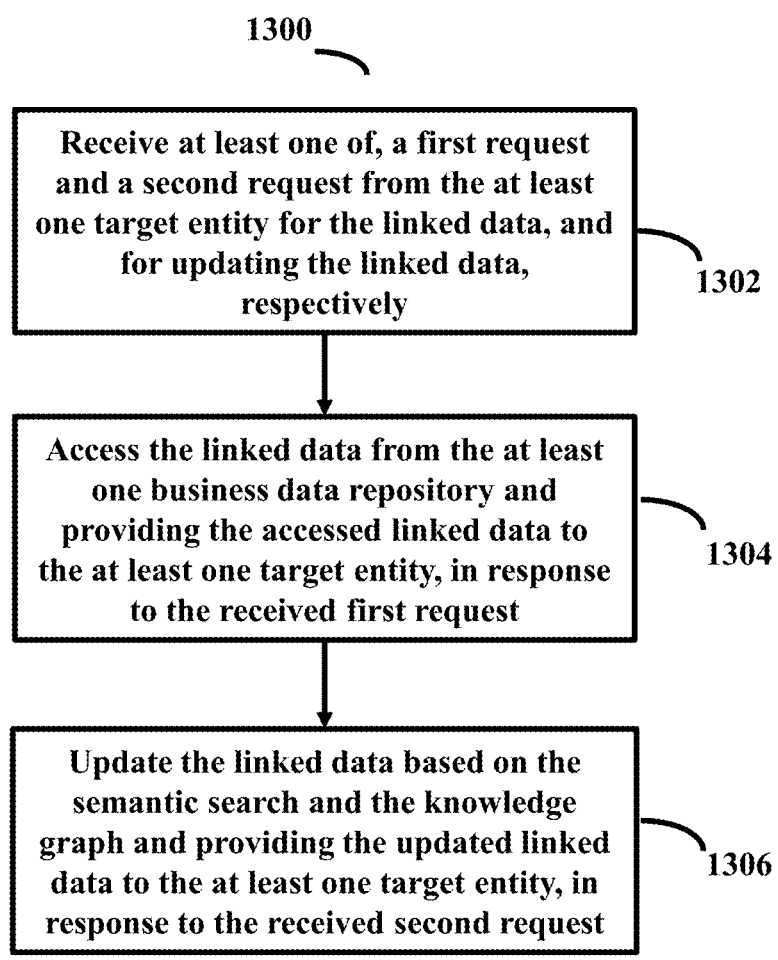
FIG. 13 is a flow diagram depicting a method for providing data management services, according to embodiments as disclosed herein.

FIG. 13 is a flow diagram 1300 depicting a method for providing the data management services, according to embodiments as disclosed herein.

At step 1302, the method includes receiving, by the data integration engine 202, at least one of, a first request and a second request from the at least one target entity 206 for the linked data, and for updating the linked data, respectively.

At step 1304, the method includes accessing, by the data integration engine 202, the linked data from the at least one business data repository 208 and providing the accessed linked data to the at least one target entity 206, in response to the received first request.

At step 1306, the method includes updating, by the data integration engine 202, the linked data based on the semantic search and the knowledge graph and providing the updated linked data to the at least one target entity 206, in response to the received second request. The various actions in method 1100 may be performed in the order presented, in a different order or simultaneously. Further, in some embodiments, some actions listed in FIG. 13 may be omitted.

Embodiments herein provide a model driven, domain neutral end to end data platform to industrialize collection of data, curate the data and link the data to derive information and knowledge.

Embodiments herein create the linked data by considering data inter-operability and intra-operability of global enterprises, due to common semantics at to language and model level.

Embodiments herein provide 360 degree connectivity which enables real time data insights for a user/customer to view graphically and visually.

Embodiments herein enable digital transformation with the trusted data to instantly advance with a data maturity capability of the user.

Embodiments herein derive knowledge from the linked data to build predictive, descriptive, or other types of analytics solutions, as well as to build and power AI based applications, wherein a clean consistent interconnected data is required with clear semantics.

Embodiments herein represent the knowledge and information using upper ontology and knowledge graphs that organize and represent data entities and relationships between the entities.

Embodiments herein provide governance and ownership across all data assets, which makes a data owner at a center of the data management.

Embodiments herein provide a single expressive way to define all data policies, data quality rules, derive data lineage and define the data/datasets, which further creates an enterprise data catalog, unifies all the data and the associated metadata and connections, creates a reusable data model, and reduces cost of data management.

Embodiments herein provide vertical tools to manage myriad of data tools, each managing its own vertical space.

Embodiments herein provide the vertical tools to manage the data from data element to data models, metadata management to data vocabulary, information governance to data governance, and master data management (MDM) to business management.

Embodiments herein provide a platform for data unification, breaking and removing data silos and islands and ultimately making the platform easier to use for the information and knowledge for variety of business outcomes, wherein the platform may also be an enabler to digital transformation and data first/data driven paradigm culture.

The embodiments disclosed herein may be implemented through at least one software program running on at least one hardware device and performing network management functions to control the elements. The elements shown in FIGS. 2-4, may be at least one of a hardware device, or a combination of hardware device and software module.

The embodiments disclosed herein describe methods and systems for data management integration. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein may be practiced with modification within the spirit and scope of the embodiments as described herein.

What is claimed is:

1. A method for data management, integration, and interoperability, the method comprising:
defining, by a data integration engine, at least one data model and asset by including data models, vocabulary, data quality rules, data mapping rules for at least one of, a particular data industry, a data domain, or a data subject area;
importing, by the data integration engine, data from a plurality of data sources;

performing, by the data integration engine, de-duplication of the imported data;
performing, by the data integration engine, data profiling of the imported data;
creating, by the data integration engine, linked data by semantic mapping, wherein creating the linked data by semantic mapping includes:
  learning to perform an annotation task using features extracted from at least one column statistics feature of a relational table;
  compressing at least one other feature into a fixed-size embedding using a subnetwork; and
  training a two-fully connected layer network on at least one embedding feature and at least one column statistics feature for predicting a column type annotation for dataset.

2. The method of claim 1, further comprising:
collecting, by the data integration engine, a first data from the plurality of data sources;
creating, by the data integration engine, the linked data, by processing the first data according to the at least one defined data model and asset;
receiving, by the data integration engine, a second data from the plurality of data sources or at least one target entity, wherein the at least one data model and asset includes the data mapping rules that describe steps to map and integrate the second data into the linked data; and
integrating, by the data integration engine, the second data into the linked data.

3. The method of claim 2, wherein creating the linked data by processing the first data according to the at least one defined data model and asset comprises:
curating the collected first data using a neural network to remove unwanted data from the collected first data, wherein the first data is curated using mapping linked rules to transform unconnected data to linked data statements, wherein if the first data is connected data, metadata of the first data is used to link distributed and federated non-graph stores; and
linking the curated data to create the linked data according to the defined at least one data model and asset, wherein the linked data corresponds to exposed, shared, and connected pieces of structured data, information and knowledge based on Uniform Resource Identifiers (URIs) and a resource description framework (RDF).

4. The method of claim 3, wherein the at least one data model and asset includes at least one of,
the data models corresponding to collections of data entities and attributes for a given data subject area;
at least one data element that is a data point uniquely identified by an identifier;
data terms that are business terms associated with a specific context;
at least one data entity corresponding to a specific concept within the respective organization;
a data shape depicting constraints received from the at least one target entity for managing data; and
Information Quality Management (IQM) rules depicting the data quality rules defined based on at least one of, the data shape and the user defined rules.

5. The method of claim 1, wherein, performing the de-duplication of the imported data comprises:
connecting, by the data integration engine, to the plurality of data sources and creating a dataset;
preparing, by the data integration engine, the dataset, by one of manual approach, or automatic approach;
applying, by the data integration engine, record linkage by comparing multiple pairs of records within the dataset and evaluating a probability of obtaining duplicates;
computing, by the data integration engine, similarity scores between each of the multiple pairs of records;
grouping, by the data integration engine, each of the multiple pairs of records that have a possibility to be duplicated into clusters; and
providing, by the data integration engine, the clusters to a user for determining clusters of potentially duplicate entries.

6. The method of claim 1, wherein defining, by the data integration engine, the at least one data model and asset based on at least one of, existing data models and assets of a respective organization, at least one industry model that ingest into the data integration engine, and user defined rules.

7. The method of claim 1, wherein, performing, by the data integration engine, data profiling of the imported data, comprises:
receiving a dataset that is to be profiled as an input;
a profile of the dataset;
generating a detailed report summarizing quality of the dataset; and
enabling report visualization in one or more formats.

8. The method of claim 1, further comprising: determining, by the data integration engine, a quality of the linked data, wherein determining the quality of the linked data includes:
generating a data quality index (DQI) for the linked data by executing the IQM rules on the linked data, wherein the DQI lesser than a threshold depicts a data quality break in the linked data;
creating a data quality remedy workflow, if the DQI depicts the data quality break in the linked data;
monitoring the data quality remedy workflow for generating remedies to fix the data quality break in the linked data;
receiving a confirmation from at least one of, a data owner, a data custodian, and a data steward, for the generated remedies; and
fixing the data quality break in the linked data using the generated remedies, on receiving the confirmation for the generated remedies.

9. The method of claim 1, further comprising: managing and updating the at least one data model and asset, and data instances using at least one of, the knowledge graph, the ontology model, and an application programming interface.

10. The method of claim 1, further comprising;
receiving, by the data integration engine, at least one of, a first request and a second request from the at least one target entity for the linked data, and for updating the linked data, respectively;
accessing, by the data integration engine, the linked data from the at least one business data repository and providing the accessed linked data to the at least one target entity, in response to the received first request; and
updating, by the data integration engine, the linked data based on the semantic search and the knowledge graph and providing the updated linked data to the at least one target entity, in response to the received second request, wherein the linked data is a fully connected and interoperable data available through open and community standards.

11. A data integration engine comprising:
a memory; and a processor coupled to the memory, wherein the processor is configured to:
  define at least one data model and asset by including data models, vocabulary, data quality rules, data mapping rules for at least one of, a particular data industry, a data domain, or a data subject area;
  import data from a plurality of data sources;
  perform de-duplication of the imported data;
  perform data profiling of the imported data;
  create linked data by semantic mapping,
wherein the processor is configured to:
  learn to perform an annotation task using features extracted from at least one column statistics feature of a relational table;
  compress at least one other feature into a fixed-size embedding using a subnetwork; and
  train a two-fully connected layer network on at least one embedding feature and at least one column statistics feature for predicting a column type annotation for dataset.

12. The data integration engine of claim 11, wherein the processor is further configured to:
  collect a first data from the plurality of data sources;
  create the linked data, by processing the first data according to the at least one defined data model and asset;
  receive a second data from the plurality of data sources or at least one target entity, wherein the at least one data model and asset includes the data mapping rules that describe steps to map and integrate the second data into the linked data; and
  integrating, by the data integration engine, the second data into the linked data.

13. The data integration engine of claim 12, wherein, for creating the linked data by processing the first data according to the at least one defined data model and asset, the processor is configured to:
  curate the collected first data using a neural network to remove unwanted data from the collected first data, wherein the first data is curated using mapping linked rules to transform unconnected data to linked data statements, wherein if the first data is connected data, metadata of the first data is used to link distributed and federated non-graph stores; and
  link the curated data to create the linked data according to the defined at least one data model and asset, wherein the linked data corresponds to exposed, shared, and connected pieces of structured data, information and knowledge based on Uniform Resource Identifiers (URIs) and a resource description framework (RDF).

14. The data integration engine of claim 11, wherein, for performing the de-duplication of the imported data, the processor is further configured to:
  connect to the plurality of data sources and create a dataset;
  prepare the dataset, by one of manual approach, or automatic approach;
  apply record linkage by comparing multiple pairs of records within the dataset and evaluate a probability of obtaining duplicates;
  compute similarity scores between each of the multiple pairs of records;
  group each of the multiple pairs of records that have a possibility to be duplicated into clusters; and
  provide the clusters to a user for determining clusters of potentially duplicate entries.

15. The data integration engine of claim 11, wherein the processor is configured to define the at least one data model and asset based on at least one of, existing data models and assets of a respective organization, at least one industry model that ingest into the data integration engine, and user defined rules.

16. The data integration engine of claim 11, wherein the at least one data model and asset include at least one of,
  the data models corresponding to collections of data entities and attributes for a given data subject area;
  at least one data element that is a data point uniquely identified by an identifier;
  data terms that are business terms associated with a specific context;
  at least one data entity corresponding to a specific concept within the respective organization;
  a data shape depicting constraints received from the at least one target entity for managing data; and
  Information Quality Management (IQM) rules depicting the data quality rules defined based on at least one of, the data shape and the user defined rules.

17. The data integration engine of claim 11, wherein, for the data profiling, the processor is further configured to:
  receive a dataset that is to be profiled as an input;
  generate a profile of the dataset;
  generate a detailed report summarizing quality of the dataset; and
  enable report visualization in one or more formats.

18. The data integration engine of claim 11, wherein the processor is further configured to determine a quality of the linked data by:
  generating a data quality index (DQI) for the linked data by executing the IQM rules on the linked data, wherein the DQI lesser than a threshold depicts a data quality break in the linked data;
  creating a data quality remedy workflow, if the DQI depicts the data quality break in the linked data;
  monitoring the data quality remedy workflow for generating remedies to fix the data quality break in the linked data;
  receiving a confirmation from at least one of, a data owner, a data custodian, and a data steward, for the generated remedies; and
  fixing the data quality break in
the linked data using the generated remedies, on receiving the confirmation for the generated remedies.

19. The data integration engine of claim 11, wherein the processor is further configured to manage and update the at least one data model and asset, and data instances using at least one of, the knowledge graph, the ontology model, and an application programming interface.

20. The data integration engine of claim 11, wherein the processor is further configured to:
  receive at least one of, a first request and a second request from the at least one target entity for the linked data, and for updating the linked data, respectively;
  access the linked data from the at least one business data repository and providing the accessed linked data to the at least one target entity, in response to the received first request; and
  update the linked data based on the semantic search and the knowledge graph and providing the updated linked data to the at least one target entity, in response to the received second request, wherein the linked data is a fully connected and interoperable data available through open and community standards.

* * * * *